United States Patent [19]

Insalaco et al.

[11] Patent Number: 5,407,522

[45] Date of Patent: Apr. 18, 1995

[54] FABRIC SECUREMENT APPARATUS

[75] Inventors: Robert W. Insalaco, Holland; Thomas L. Dykstra, Hamilton, both of Mich.

[73] Assignee: Haworth, Inc., Holland, Mich.

[21] Appl. No.: 62,778

[22] Filed: May 17, 1993

Related U.S. Application Data

[62] Division of Ser. No. 788,764, Nov. 7, 1991, Pat. No. 5,238,515.

[51] Int. Cl.6 .......................... E04H 1/00; B32B 31/20
[52] U.S. Cl. ..................................... 156/465; 156/479; 156/486; 156/293
[58] Field of Search ................ 156/479, 475, 486, 481, 156/477.1, 293, 275.7, 212, 216, 202, 201, 465; 160/135; 52/239

[56] References Cited

U.S. PATENT DOCUMENTS

| | | | |
|---|---|---|---|
| 2,791,264 | 5/1957 | Couse | 156/202 X |
| 3,296,056 | 1/1967 | Bechtold | 156/202 X |
| 3,871,153 | 3/1975 | Birum, Jr. | 52/239 X |
| 4,183,986 | 1/1980 | Blaetterlein | 156/292 X |
| 4,248,657 | 2/1981 | Henry | 156/479 X |
| 4,635,418 | 1/1987 | Hobgood | 52/239 |
| 4,684,425 | 8/1987 | Bannister | 156/212 |
| 4,741,797 | 5/1988 | Henderson et al. | 156/479 |
| 4,851,070 | 7/1989 | Shimada | 156/212 X |
| 4,949,518 | 8/1990 | Nagel et al. | 52/239 |
| 4,968,366 | 11/1990 | Hukki et al. | 156/160 X |
| 5,258,083 | 11/1993 | Monk et al. | 52/239 X |

OTHER PUBLICATIONS

Shields, Adhesives Handbook, 1970, pp. 28–29.

*Primary Examiner*—Michael W. Ball
*Assistant Examiner*—Michele K. Yoder
*Attorney, Agent, or Firm*—Flynn, Thiel, Boutell & Tanis

[57] ABSTRACT

A method and apparatus for securing an enlarged sheet-like fabric to a side face of a panel which is provided with edge frame elements having retaining channels extending therealong. Each retaining channel has a film or bead of a solid adhesive therein. An edge portion of the fabric is positioned to extend over the mouth of the groove, and is then folded over an inserting member which inserts the fabric edge portion into the groove. Substantially simultaneously the adhesive film or bead is heated, as by an induction heater, and the inserting member presses the folded fabric edge portion into the melted adhesive. This contact is maintained and the adhesive is subjected to cooling to effect resolidification thereof and fixed securement of the inserted fabric portion to the channel part. The insertion preferably involves an inserting device having a plurality of blade-like rollers which insert the fabric into the channel as the edge frame of the panel relatively moves longitudinally along the set of rollers.

15 Claims, 7 Drawing Sheets

FABRIC SECUREMENT APPARATUS

This is a division of application Ser. No. 07/788 764, filed Nov. 7, 1991, now U.S. Pat. No. 5,238,515.

FIELD OF THE INVENTION

This invention relates to a method and apparatus for securing a large fabric-like sheet, which is positioned to extend over an enlarged surface of a panel-like member, to the peripheral edge of the panel-like member. More specifically, this invention relates to an improved method and apparatus for securing a fabric sheet to at least one side of a space divider panel, and in addition relates to an improved structure for the space divider panel.

BACKGROUND OF THE INVENTION

Upright space-dividing wall panels are conventionally utilized in offices and the like for dividing large work spaces into smaller work areas. The wall panels are conventionally in the range of 1' to 5' wide, and have a height which varies approximately from desk height to ceiling height. These panels typically have one or both opposed side faces thereof covered by fabric sheets which are stretched across the panel faces and secured along the panel boundaries or edges. The securement of the fabric along the panel edges is conventionally accomplished by several known techniques, most of which employ a gripping member for holding the fabric edge to maintain the fabric in a stretched or taut condition as it extends across the panel side face. In one conventional securing technique, the panel is provided with an outwardly opening retaining channel along each edge thereof, which retaining channel is configured to permit an edge portion of the fabric to be folded therein, with a retaining member such as an elongate flexible endless band or similar such element inserted into the retaining channel to hold the fabric therein while at the same time maintaining the fabric in a stretched or taut condition. This structure, however, and the method of securing the fabric to the panel, is costly and time consuming with respect to required assembly time and labor.

Reference is made to U.S. Pat. Nos. 4 084 366 and 4 213 493, both owned by the Assignee hereof, which disclose conventional methods and structures for securing edge portions of a fabric to a space-divider panel, such structures corresponding substantially to those described above.

Accordingly, it is an object of this invention to improve upon the prior structures and methods as described above, and more specifically to provide an improved method and apparatus for securing a fabric to a space-divider panel so that the fabric can be maintained in a desired taut condition over the panel side face while permitting the edge of the fabric to be easily and economically secured, and at the same time permitting relatively easy removal of the fabric when and if desired for permitting replacement thereof. More specifically, it is an object of this invention to provide an improved method and apparatus for permitting edge portions of a flexible fabric sheet, as positioned over an enlarged side face of a wall panel, to be efficiently and substantially automatically secured around the perimeter or edges of the wall panel while requiring only minimal manual labor and supervision, and at the same time providing the desired degree of stretch or tautness in the fabric so as to provide for proper covering of the panel side face.

It is also an object of the present invention to provide an improved method and apparatus for securing a fabric to a panel, as aforesaid, which permits the fabric to be secured to and stretched across the side face of the panel, including wrapped around the panel corners, while providing an overall desirable appearance and providing improved appearance and handling of the fabric where it wraps around the corners.

A further object of the invention is to provide an improved method and apparatus for securing a fabric to a panel, as aforesaid, wherein the securing arrangement utilizes an adhesive for securing the fabric edge portion within a retainer channel associated with the panel so that separate retainer strips or bands are not required.

It is a further object of the invention to provide an improved method and apparatus for securing a fabric to a panel, as aforesaid, which enables the fabric to be subsequently removed from the panel if desired, such as for replacements of the fabric, with the replaced fabric then being securable to the panel utilizing a conventional securing technique, such as by employing an elongate endless elastic band.

Summarizing the method and apparatus of the present invention, a panel is provided with a rectangular frame having elongate frame elements which extend along the edges of the panel, with each frame element having one or more elongate fabric-receiving channels. A film or bead of meltable adhesive extends interiorly along each of the channels. The panel is disposed on a panel transfer assembly so that one side face of the panel is oriented upwardly, and a fabric sheet is disposed to extend across the upwardly-facing side face of the panel with edge portions of the sheet overlying the frame elements. The panel is relatively moved past a pair of opposed roller assemblies disposed on opposite sides of the panel, which roller assemblies engage and force the edge portions of the fabric, on opposite sides thereof, into respective fabric-receiving channels. Substantially simultaneously therewith the edge frame elements are also relatively moved past a heating element, such as an induction heater, which effects rapid melting of the adhesive as the fabric is being forced into the channels by the rollers. The inward forcing of the fabric into the channels by the rollers also effects stretching of the fabric across the panel to achieve the desired tautness. Shortly thereafter the panel edge frame elements are relatively moved under a cooler such as an air jet which effects rapid resolidification of the adhesive, and securement thereof to the edge portions of the fabric. After the rollers have relatively moved throughout the length of one opposed pair of side frame elements, then the panel is subjected to the same process along the remaining pair of side frame elements so as to effect securement of the fabric along all four sides of the panel.

Other objects and purposes of the invention will be apparent to persons familiar with structures of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The word "forward" will refer to the normal direction of movement of the panel relative to the fabric-inserting assemblies during the fabric-inserting process. The words "inwardly" and "outwardly" will refer to directions toward and away from, respectively, the geometric center of the panel or apparatus, and designated parts thereof. Said terminology will include the words specifically mentioned, derivatives thereof, and words of similar import.

DETAILED DESCRIPTION

Figure 1:
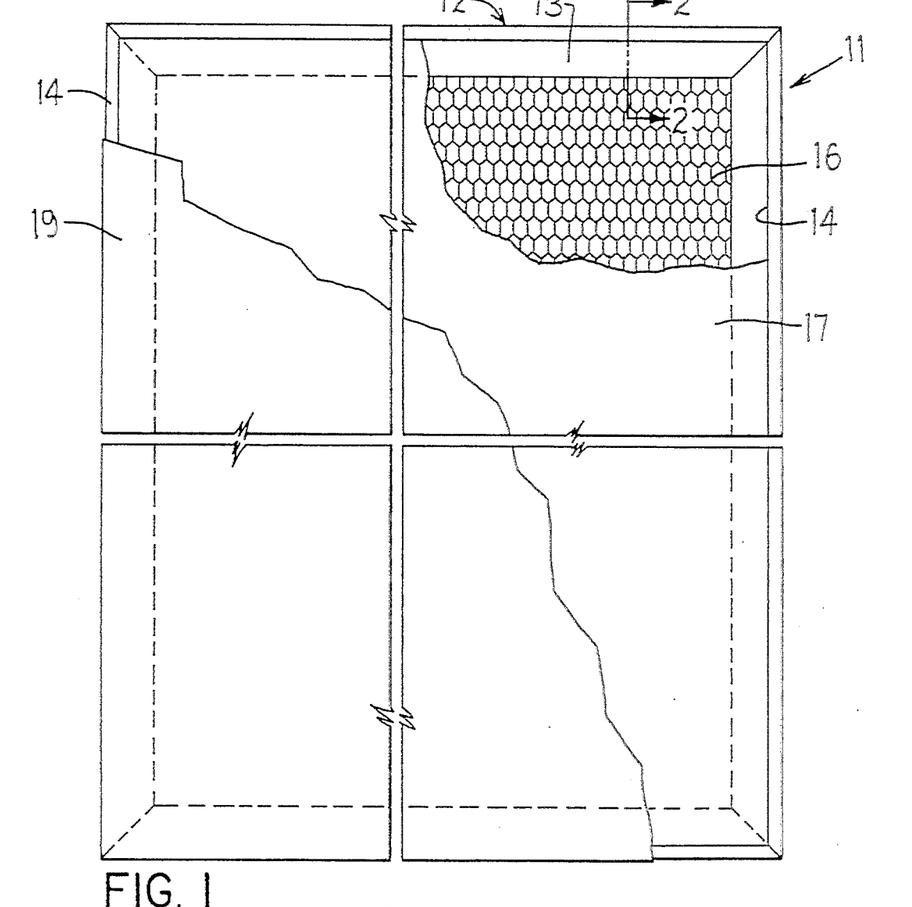
FIG. 1 is a side view, partially broken away, and illustrating a conventional wall panel having a fabric covering on at least one side face thereof.

Referring to FIG. 1, there is illustrated a wall panel 11 of the type utilized in offices and the like for dividing larger spaces or areas into smaller work areas. A plurality of such panels are normally disposed in an upright condition with adjacent edges horizontally connected in series to define an upright wall used for space-dividing purposes. Such panels and their use are conventional, and reference is made to U.S. Pat. No. 4 084 366 which describes such panels in greater detail.

The panel 11 includes a generally rigid ring-shaped frame 12 which is generally of rectangular configuration, similar to a picture frame. This rigid frame 12 is defined by an opposed pair of generally parallel and elongated edge frame members 13, such as horizontally extending top and bottom frame members, which are rigidly joined together by a further pair of generally parallel elongated edge frame members 14 which typically extend vertically along opposite sides of the frame. The interior of the frame 12 is normally occupied by a core structure of conventional constructions. In the illustrated embodiment, the core structure within the frame includes an inner or centrally positioned paper honeycomb layer 16 which is sandwiched between a pair of side sheets 17, the latter being of a construction similar to fiber or mineral board or similar such construction. These side boards 17 in turn are covered by vertically enlarged sheets of a thin flexible covering material 19 such as a fabric. These fabric sheets 19 extend coextensively over the entire side faces of the panel, with these fabric sheets 19 having edge portions which are secured to the frame edge members 13, 14 as explained hereinafter.

The edge frame elements 13, 14 are often referred to as frame or edge rails, and will be so designated herein for convenience in reference.

Figure 2:
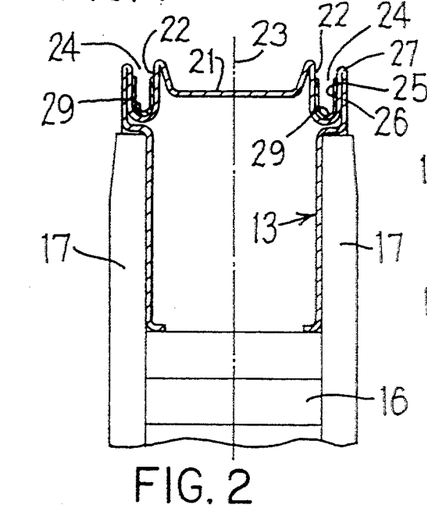
FIG. 2 is an enlarged fragmentary cross sectional view, taken substantially along line 2—2 in FIG. 1, and illustrating the edge frame member of the panel in preparation for fabric securement.
Figure 3:
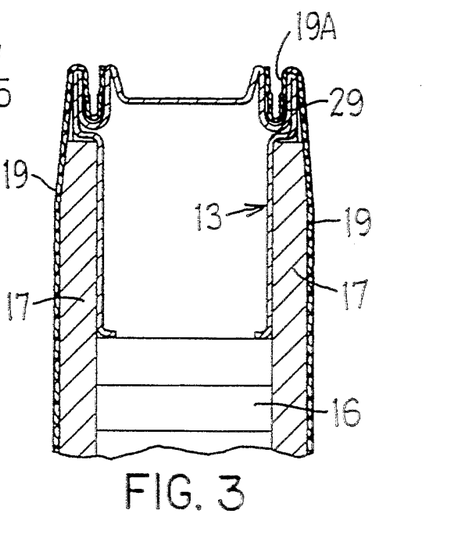
FIG. 3 is a view similar to FIG. 2 but showing the fabric secured to opposite sides of the panel.

The frame rails 13, 14 are transversely dimensioned so as to extend across substantially the full width of the panel and, as illustrated by FIGS. 2 and 3, each includes a center web structure 21 which is fixedly joined to a pair of generally U-shaped parts 22 disposed adjacent opposite sides of the panel. These U-shaped parts 22 are generally disposed substantially symmetrically on opposite sides of a central vertical plane 23 of the panel. Each U-shaped part 22 defines therein an outwardly opening channel or groove 24 which is elongate throughout the entire length of the respective frame rail. The channels or grooves 24 associated with the same rail both open generally outwardly away from the interior of the panel and generally outwardly away from one of the elongated dimensions of the panel. In the illustrated embodiment, the pair of grooves 24 associated with the end rail open outwardly in the same direction and in generally parallel relationship with one another.

The frame rail 13, 14 is preferably formed as an integral one-piece structure, such as by being stamped or roll formed from thin metal sheet. This permits the center web 21 and the channel parts 22 to be rigidly and integrally formed. At the same time the outer sidewall 25 of each channel part 22 can have the outer end of its leg rolled over through an angle of about 180° and then joined to a reversely oriented outer side flange 26 which functions to define a deep channel structure for providing the frame with the desired strength and rigidity. The outer rounded corner 27 also facilitates the safe wrapping therearound of the fabric.

Prior to using the apparatus and performing the method of the present invention, each channel part 22 of each frame rail 13, 14 is provided with a thin film or layer 29 of a solidified but meltable adhesive secured therein, which film 29 is generally U-shaped in cross section and extends longitudinally throughout the length of each channel 24 and coats substantially the entire inner wall defining the channel, including not only the bottom wall but also the opposed sidewalls. This adhesive film is preferably sprayed into and solidified within the channel part either prior to or more preferably after fabrication of the rectangular frame. This film forming step, however, can be performed entirely independent of and at a remote location from the fabric securing process described below.

Figure 4:
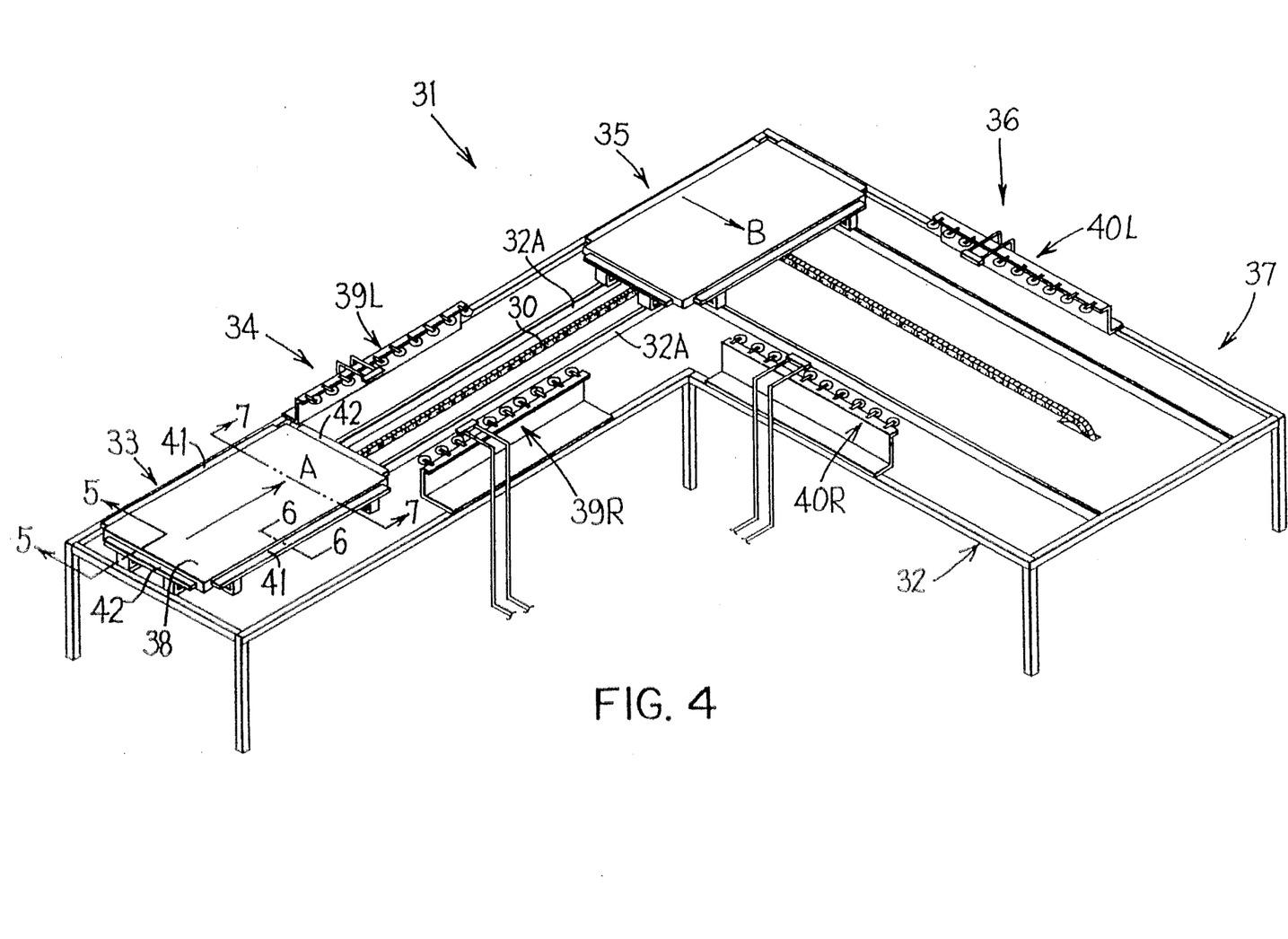
FIG. 4 is a diagrammatic perspective view of the panel fabric securement method and apparatus of the present invention.

Referring to FIG. 4, there is diagrammatically illustrated an apparatus 31 for permitting securement of a fabric to a side face of the panel. This apparatus 31 includes a suitable support frame 32 which defines thereon multiple horizontally spaced work stations for permitting the automatic movement of a panel forwardly into and through the work stations for securing the fabric to the side face. More specifically, the apparatus 31 includes an input or receiving station 33 which receives the panel prior to securement of a fabric thereon, a station 34 which receives the panel and secures opposite fabric edges to opposite side rails of the panel, a station 35 which thereafter re-orients the panel in terms of changing either its direction of movement or its orientation so as to permit the panel to be supplied to a further fabric securing station 36 which secures fabric edges to the remaining pair of opposed edge rails, after which the panel is discharged to a suitable discharge station 37.

The apparatus 31 preferably includes a panel support platform or table 38 which is horizontally enlarged and faces upwardly for permitting securement of a horizontally-oriented panel thereon. This support table or platform 38 is movable horizontally in the direction of arrow A which is parallel to one pair of panel side rails for moving the panel into and through the first fabric securement station 34. At station 35, in this embodiment, the platform 38 is then moved in the direction of arrow B which is perpendicular to arrow direction A, and moves the panel through the other fabric securing station 36 to secure the remaining side edges of the fabric. At station 35, while the illustrated apparatus discloses moving the panel support platform in a perpendicular or transverse direction, it will be appreciate that station 35 could be provided with a rotating table which would rotate the panel 90°, and permit the panel to thereafter move forwardly into the second fabric securing station along the same direction as indicted by arrow A.

In the illustrated embodiment, the frame of the apparatus includes a pair of sidewardly spaced support rails 32A which extend parallel to the direction of movement of the panel and slidably support runners defined on the underside of the support table 38 so as to permit horizontal movement of the support table between the various work stations. In addition, a suitable drive device cooperates with the support table 38 so as to effect linear advancing movement thereof between the work stations. Any suitable and conventional drive device can be provided for such purpose, such as a drive device including a drive chain having a reach 30 extending longitudinally along the apparatus and being selectively engageable with a suitable drive lug on the underside of the table for effecting advancing movement thereof when desired. Drive devices of this general type are conventionally utilized in numerous assembly line manufacturing operations, and hence a further description thereof is believed unnecessary since such devices are well known and numerous variations of such drives can be utilized in the apparatus of this in invention.

Each of the fabric securing stations 34 and 37 have a pair of fabric securing devices 39 and 40, respectively, disposed on opposite sides thereof and positioned for engaging the opposite sides of the panel. These fabric securing devices 39, 40 are substantially identical and include, in a preferred embodiment, the capability of inserting the fabric into the channels 24 of the groove parts 22, melting the adhesive films within the grooves, and thereafter recooling and resolidifying the adhesive to fixedly attach the fabric to the respective groove part.

To properly position and stationarily secure a panel to the support table 38, the latter is provided with a pair of releasable side clamps 41 thereon which cooperate with opposite side rails of the panel. Support table 38 also has a pair of releasable end clamps 42 which cooperate with the opposite end rails of the panel to properly position and stationarily secure the panel.

Figure 6:
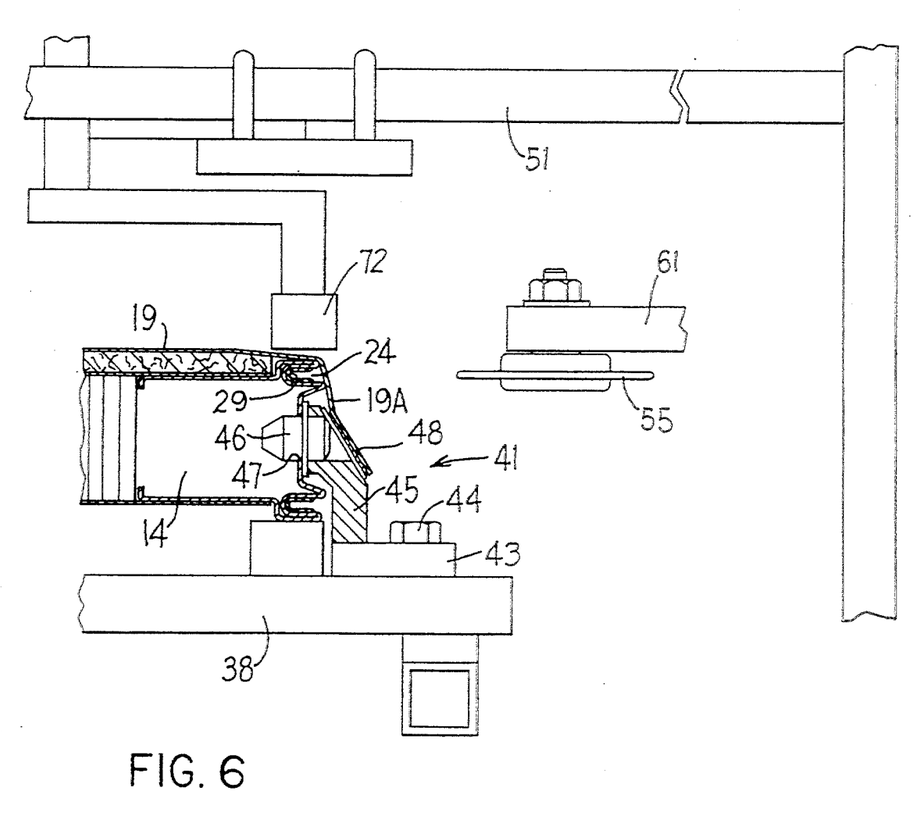
FIG. 6 is an enlarged, fragmentary sectional view taken substantially along line 6—6 of FIG. 4 and illustrating the fabric securement structure which extends along the longitudinal edges of the panel.

The side clamps 41, as illustrated by FIG. 6, each includes a base part 43 which is movably, here slidably, supported on the table 38 so as to be movable toward and away from the adjacent side frame rail 14 to respectively engage or disengage the panel. This base portion 43, in the illustrated embodiment, is provided with suitable clearance slots (not shown) through which project releasable fasteners 44 to permit sideward in and out displacement of the clamp, followed by securement of the clamp when in the inner or panel-engaging position. This base portion 43 mounts thereon a pair of upwardly projecting arms 45 which adjacent their upper ends are provided with inwardly projecting support pins 46 which are generally horizontally cantilevered and are adapted to project through a similar sized opening 47 formed through the central web of the frame rail 14. The pins 46, and the associated openings 47, are preferably positioned adjacent opposite ends of the respective frame rail 14 to properly position and securely support the panel along one edge thereof.

Figure 5:
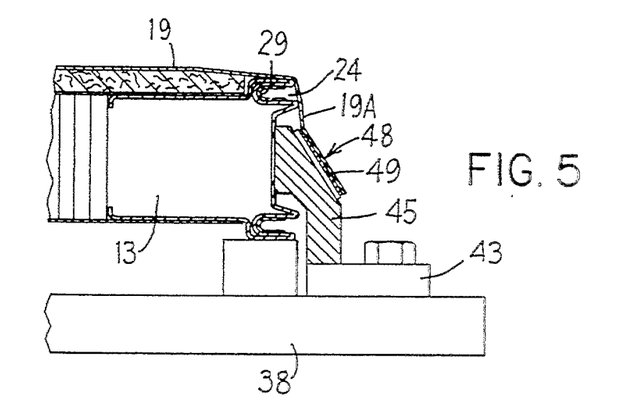
FIG. 5 is an enlarged fragmentary sectional view taken substantially along line 5—5 in FIG. 4 and showing the fabric anchoring structure provided along the transversely extending edges of the panel.

The end clamp 42, shown by FIG. 5, is of similar construction and corresponding parts thereof have been identified by the same references numerals. However, guide pins 46 are not necessary and hence are not provided on the end clamps.

The clamps 41 and 42 as described above illustrate only one possible arrangement for securing the edges of the panel to the support table 38, and it will be appreciated that numerous other clamp structures can be provided for accomplishing this objective. For example, the clamps can be coupled to suitable drive devices such as small linear pressure cylinders for controlling and automating the in-and-out movement of the clamps. As a further example, the clamping arrangement for securing the panel may involve replaceable bars or frames which secure to the support table and are sized according to the size of the panel to be covered, with each size of panel having its own clamping frame or set of clamping bars so as to facilitate the positioning of and clamping of the panel in a time saving and efficient manner. Such clamping frame or clamping bar system would be particularly desirable when large quantities of identically sized panels are being fabric covered.

When the panel is supported on the support table 38 and a fabric layer 19 has been positioned over the upper side face, the oversized fabric sheet is positioned so that edge portions 19A of the fabric hang downwardly past the uppermost channels 24 by a significant extent. This edge portion 19A is releasably engaged and held along a significant longitudinal extent thereof by a releasable fabric attachment structure 48 which is provided on and extends generally longitudinally along each of the clamps 41 and 42. This fabric attachment structure 48, in the illustrated embodiment, is defined by a support plate on which appropriate Velcro (trademark) strips 49 are attached, which strips are suitably angled so that they face outwardly but upwardly to permit releasable attachment of the fabric edge portions 19A. This edge securing structure 48 enables the enlarged central portion of the fabric 19 to be stretched across and held over the upper enlarged side face of the panel, with the edge portions 19 being stretched downwardly over the upper channels 24. These edge securing structures 48, however, must be capable of permitting release of the fabric if the tension of the fabric reaches a predetermined amount during the fabric-inserting process as described hereinafter. While Velcro strips have been disclosed as the releasable securing structure for the fabric edge portions 19A, numerous other structures such as friction-type clamps or pneumatic holding devices can also be utilized for accomplishing this purpose.

Figure 7:
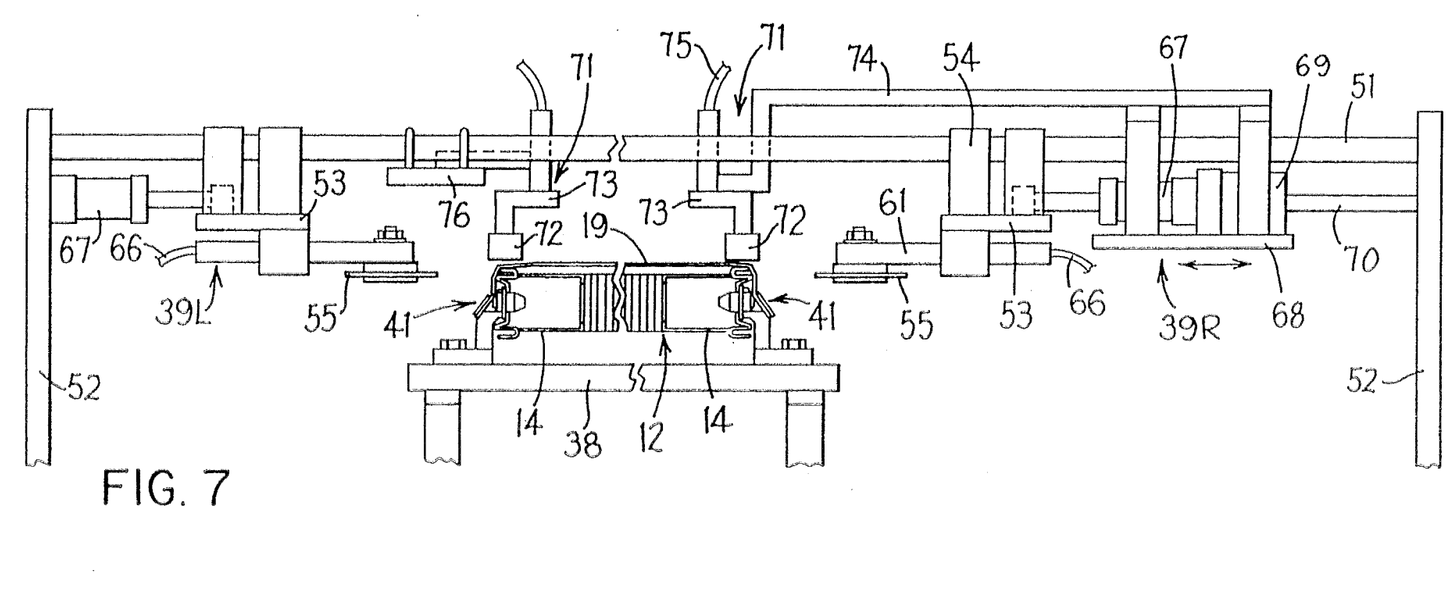
FIG. 7 is an enlarged elevational view taken substantially along line 7—7 in FIG. 4 and illustrating the vertical cross section of the panel during the fabric securement step, and the relationship of the heating and fabric insertion devices.
Figure 8:
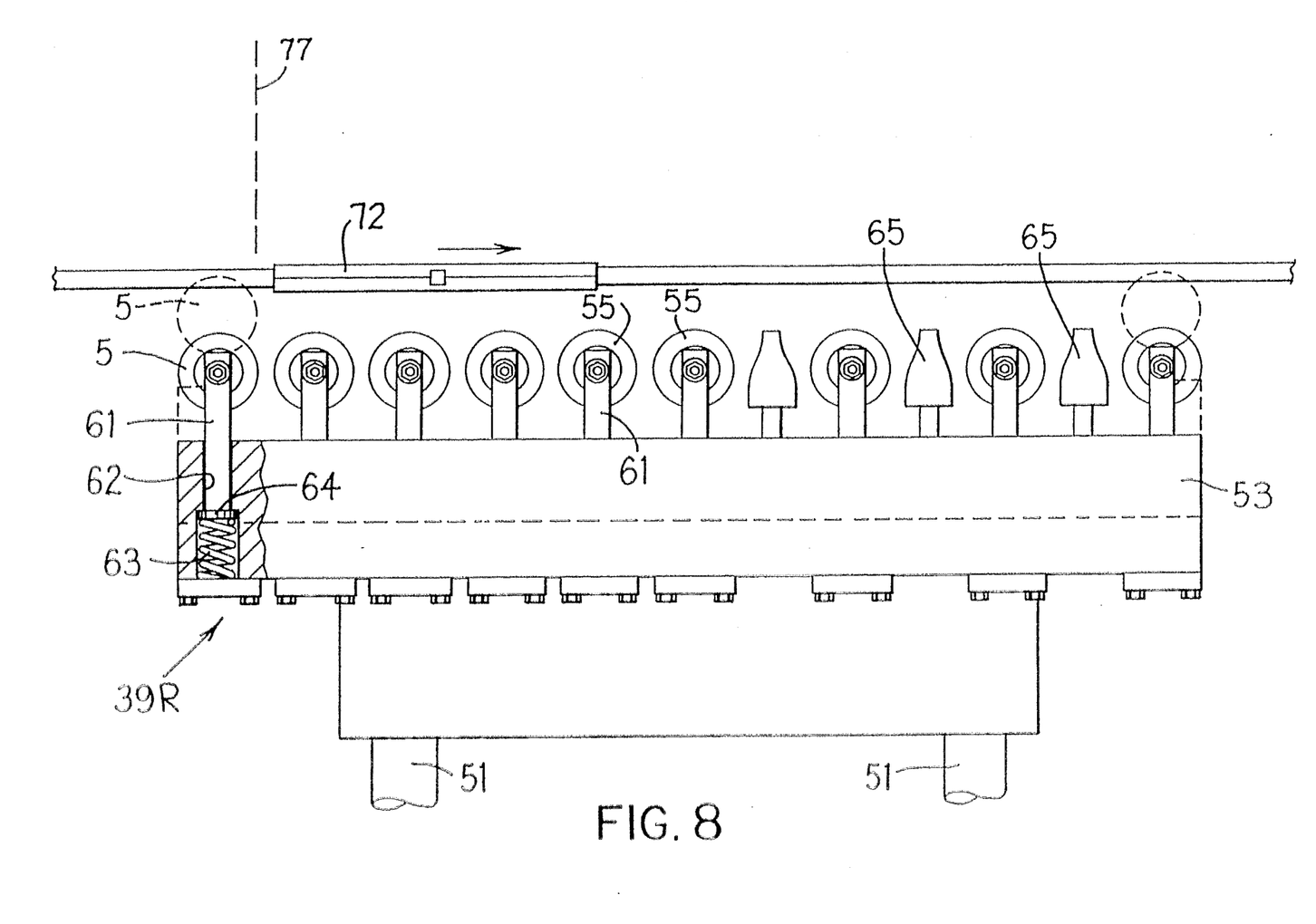
FIG. 8 is a top or plan view of one of the fabric inserting assemblies as disposed along one longitudinal edge of the panel, it being understood that a substantially identical fabric inserting assembly is also disposed adjacent the opposite longitudinal edge of the panel.
Figure 9:
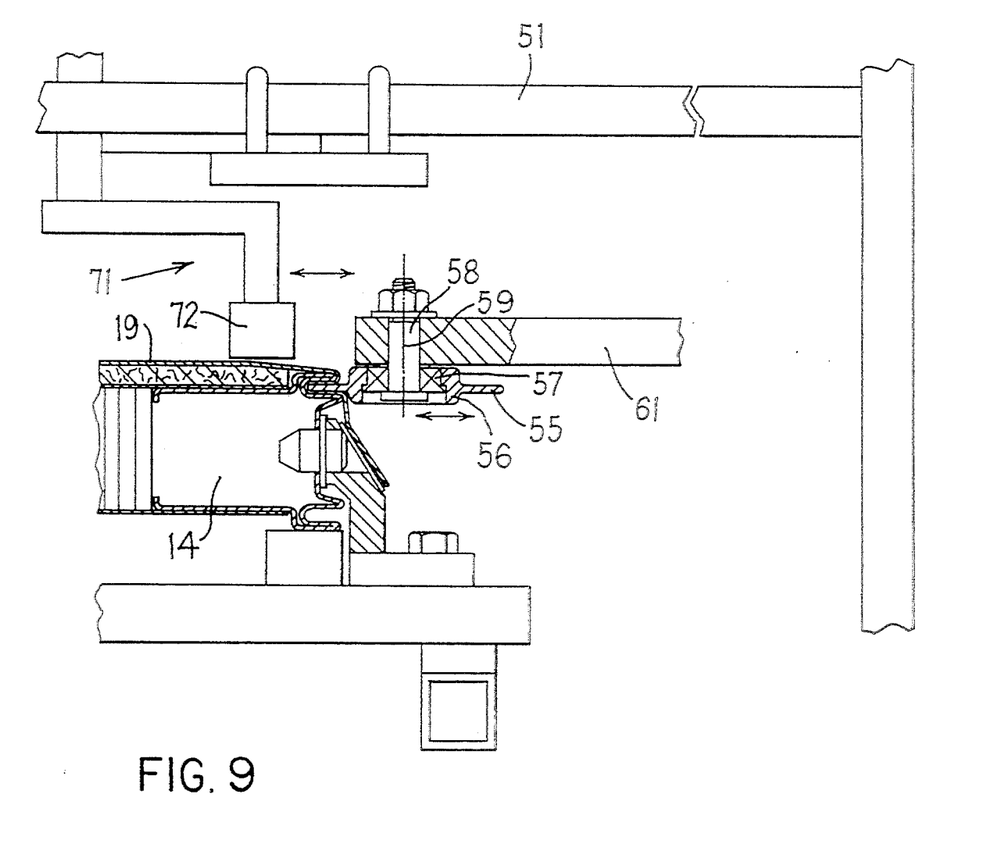
FIG. 9 is a fragmentary and enlarged transverse sectional view showing the engagement between the fabric inserting assembly and the panel edge channel.
Figure 10:
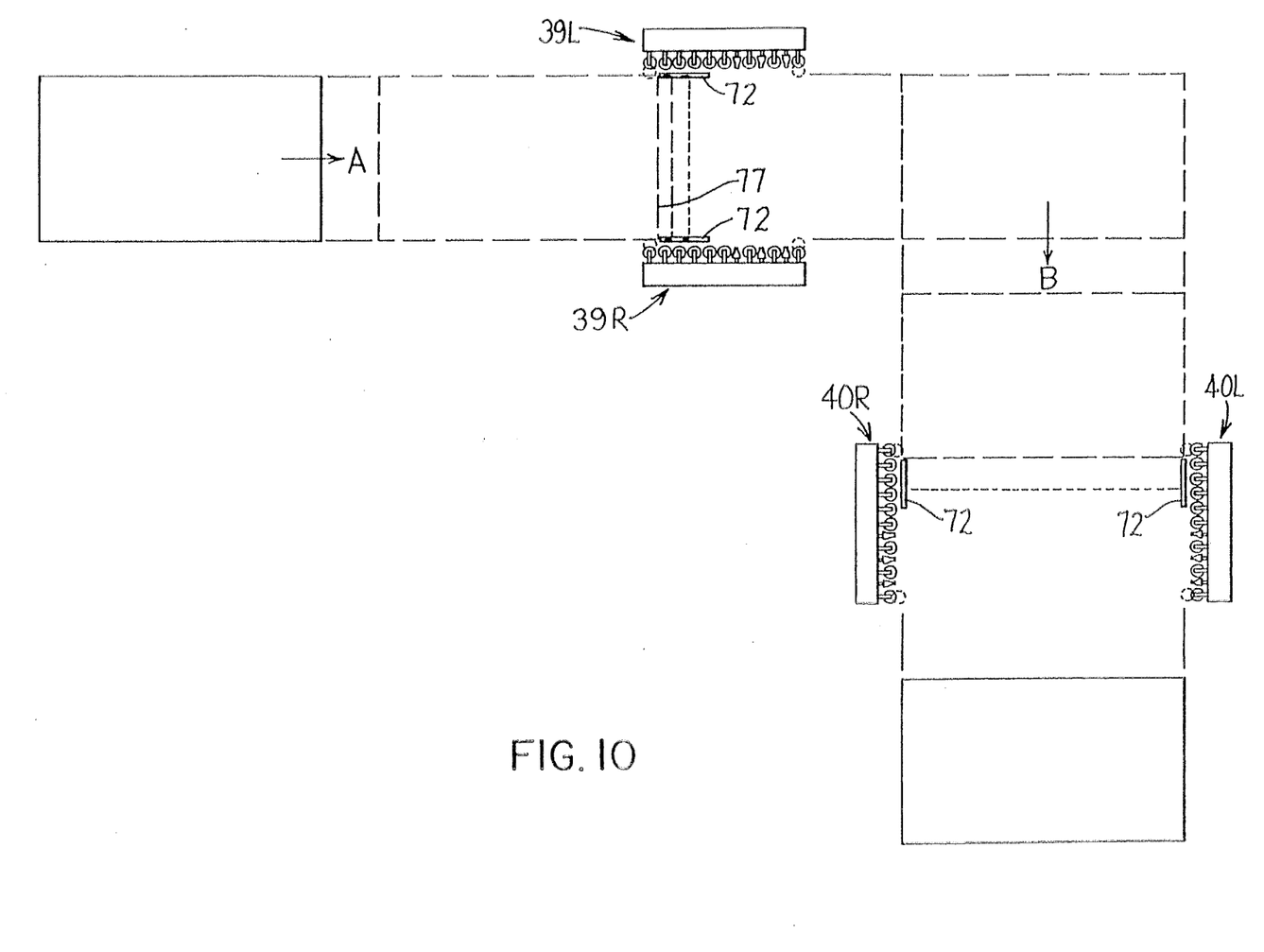
FIG. 10 is a diagrammatic plan view showing, in outlined form, sequential movement of a panel through two sets of opposed fabric-inserting assemblies so as to permit securement of the fabric to all four edges of the panel.

Referring now to FIGS. 7–9, a pair of sidewardly spaced but horizontally elongated support rods 51 are spaced upwardly above the panel movement path and extend sidewardly across the apparatus so that opposite ends of these rods 51 are fixedly secured to support posts 52 which are fixed to and project upwardly adjacent opposite sides of the frame. The opposed pair of fabric securing devices 39 are disposed adjacent the opposite ends of these support rods 51 and, as illustrated by FIG. 7, this opposed pair has been designated 39R and 39L for convenience in reference.

Considering the fabric securing device 39R, it includes a carriage 53 which is elongate parallel to the adjacent edge of the panel and is provided with hangers 54 which slidably support the carriage on the frame rods 51 for horizontal movement in a direction which is generally perpendicularly toward or away from the adjacent elongated frame edge rail (such as rail 14). This carriage 53 mounts thereon, in longitudinally spaced relationship therealong, a plurality of rollers 55 which effect insertion and pressing of the fabric edge portion 19A into the adjacent retaining channel 24. Each roller 55 has a circular outer profile and has a vertically thin blade or plate-like thickness which is about two fabric thicknesses less than the width of the channel 24. Each roller 55 also has a central hub portion 56 which is supported by a bearing 57 so that the roller is freely rotatably supported on a support shaft 58 which extends vertically and defines a vertical axis 59 about which each roller is freely rotatable. The shaft 58 is mounted on a support arm 61 as associated with each roller. Each arm 61 projects horizontally in a sideward (i.e. perpendicular) direction away from the panel edge and slidably projects into and is supported within a guide opening 62 formed in the carriage 53. A spring 63 is captivated within the carriage 51 and acts against the inner end of support rod 61 so as to urge this rod 61 and the roller 55 thereon into an outermost position relative to the carriage, as defined by contact of a stop 64 on the rod against an opposed shoulder on the housing.

The securing device 39 also preferably mounts a cooling device thereon which, as illustrated by FIG. 8, includes one or more air discharge nozzles 65 which are mounted on the carriage adjacent the downstream end thereof and are preferably mounted in close proximity to and between some of the rollers 55. These nozzles 65 have an air discharge opening at the outer end directed inwardly toward the opposed channel 24 and communicating through manifolding (not shown) provided in the carriage 51 with suitable air supply hoses 66 which connect to an air pressure source. The nozzles 65 are preferably of the vortex type so as to effectively discharge relatively cold air to effect rapid cooling and hence solidification of the adhesive.

The carriage 53 is horizontally reciprocal through a small stroke in a direction which is generally perpendicular relative to the opposed side rail 14, whereby the rollers 55 can be moved between an outer or retracted position illustrated by FIG. 6 and an inner or fabric-inserting or securing position as illustrated by FIG. 9. This movement of the carriage between the retracted and inserting positions is accomplished by a drive device 67, such as a fluid pressure cylinder, which has its piston rod coupled to the carriage 53 and its housing carried on a panel-width size adjusting carriage 68. This width-adjusting carriage 68 is also horizontally sidewardly supported on the frame rods 51 and mounts thereon a width-adjusting actuator 69, such as a linear motor or screw mechanism which has a part 70 thereof coupled to the frame post 52. This width-adjusting device 69 is actuated to initially position the fabric securing carriage 53 in a proper position relative to the panel in dependence upon the width of the panel being processed. After the carriage 53 has been properly positioned, then actuation of actuator 69 is normally no longer required so long as the same width panels are being handled.

The fabric securing device 39 also includes a heating unit 71 for effecting heating and hence melting of the adhesive film 29 as disposed within the channel 24 to permit securement with the inserted fabric. This heating unit 71 includes a horizontally elongate electric heating element 72, preferably an induction heater, disposed so as to extend generally parallel with and position in close proximity to the respectively adjacent panel edge rail, such as rail 14. This induction heater is mounted on a carrier 73 which, with respect to the fabric securing device 39R, is coupled to and movable with the width adjustment carriage 68 by means of an intermediate support arm 74. An appropriate electrical wire 75 couples the induction heater to an external direct current electrical potential source.

As illustrated by FIGS. 8 and 9, the induction heating element 72 is positioned closely adjacent but spaced slightly inwardly from the inserting rollers 55, and is positioned slightly over but closely adjacent the uppermost channel part 22 of the adjacent frame rail. The induction heater 72 is oriented so that the field generated thereby is emitted directly into the adjacent channel part 22 so as to effect rapid melting of the adhesive strip 29 contained within the groove 24 as the panel moves linearly underneath the elongated direction of the induction heating element 72.

Considering now the opposed fabric securing device 39L, it can be substantially identical to the opposed device 39R. However, since adjustment for panel width can be accomplished by making a positional adjustment on only one side of the panel if desired, such is the mode of operation of the illustrated embodiment, and hence all panel width adjustment is provided by means of the device 39R and the panel width adjustment provided by the intermediate carriage 68 and the width-adjusting actuator 69.

The device 39L again includes a carriage 53 slidably supported on frame rods 51 and carrying thereon the insertion rollers 55, with the carriage 53 being activated by the pressure cylinder 67 for moving the rollers between the insertion and retracted positions. In this case, however, the housing of the pressure cylinder 67 associated with device 39L is anchored directly to the adjacent support frame 52.

The securing device 39L also has a heating unit 71 associated therewith, the latter being disposed with the induction heating element 72 positioned directly over and along a portion of the other edge frame rail of the panel. This latter heating unit 71, however, in this instance is mounted on a support 76 which is stationarily positioned on the frame rods 51.

Operation

The operation of the apparatus and the process of using same to permit securement of a fabric to a panel will now be described in detail to ensure a complete understanding thereof.

The apparatus 31 is normally in a position substantially as illustrated by FIGS. 4 and 7 wherein the opposed pairs of fabric securing devices 39 and 40 are in the retracted positions. Further, it is assumed that they are spaced apart by a distance which is suitable for use with a particular width panel by having previously adjusted the position of at least the securing device 39R and 40R by means of the width-adjusting actuator 69.

Prior to carrying out the method of this invention, a panel is partially assembled so that the panel is basically complete except for the fabric coverings. For example, in creation of this partially-assembled panel, there is initially formed the elongated metal frame rails, such as by roll forming. A set of four frame rails is then fixedly secured together to define the open but rectangular rigid frame 12. Each of the frame rails 13 and 14 defining this frame 12 has a channel part 22 extending longitudinally along one, and preferably both, sides thereof so as to accommodate fabric coverings on one or both sides of the panel. Each of these channel parts 22 as associated with each frame rail 13 and 14 is initially provided with a strip of solid but meltable adhesive 29 interiorly of the channel part and extending longitudinally throughout the length thereof. This solid adhesive strip 29 is preferably created in the channel part by injecting the adhesive in liquid form into the channel part throughout the longitudinal length thereof and then permitting the adhesive to solidify within the channel part. This injection of the adhesive preferably is accomplished by spraying the adhesive into the groove, such as by inserting a small nozzle into the groove and then effecting relative longitudinal movement between the nozzle and channel part to effectively spray coat the sidewalls and bottom wall of the groove, thereby permitting formation of a thin solidified layer of adhesive longitudinally throughout the length of the channel part. This spraying of the adhesive into the channel part may be accomplished directly after roll forming of the rails, but is preferably carried out after the rails have been rigidly assembled to form the frame 12. After formation of the open frame 12, then the core structure 16, 17 is inserted into the interior of the open frame, thereby completing the initial assembly of the panel prior to attachment of the fabric side covers.

A panel without a fabric covering on at least one side thereof is thereafter positioned on the support table 38 at the station 33 so that the uncovered side face of the panel is oriented substantially horizontally and upwardly facing. The side and end clamps 41 and 42, respectively, are activated to engage the panel along all four sides thereof to fixedly and stationarily position the panel on the support table 38. A sheet of fabric 19 of predetermined size, which size is greater than the dimension of the panel side face, is then positioned so as to extend horizontally over the upper exposed side face of the panel so that edge portions 19A of the fabric hang downwardly a limited extent along each edge rail of the panel. These depending edge portions 19A of the fabric are suitably secured or anchored, such as by attaching the edge portions 19A to the Velcro strips 49 associated with the securing devices 48.

The support table 38 is then advanced forwardly in the direction of arrow A (FIG. 4) until the lead end of the panel is disposed closely adjacent the upstream end of the fabric securing devices 39. In fact, the lead end of the panel is advanced forwardly until reaching a position substantially as indicated by the dotted line 77 in FIG. 8, at which position the forward ends of the opposed side rails 14 overlap at least the upstream rollers 55 associated with the devices 39, but the forward end of the panel is positioned close to but slightly short of the upstream end of the induction heater element 72. When reaching this position 77, the panel is stopped, such as by sensors (not shown) which sense the forward end of the panel and stop the drive device for the support table 38. When in this entry position indicated by dotted lines 77, the opposed pairs of fabric securing devices 39R, 39L are activated whereby cylinders 67 move the carriages 53 and the sets of rollers 55 thereon inwardly toward the panel, whereby the blade of the upstream roller 55 contacts the fabric 19A which is extended across the groove 24 as illustrated by FIG. 6 and deflects the fabric inwardly into the groove as illustrated by FIG. 9. This deflection or folding of the fabric into the groove 24 is accomplished primarily by stretching of the fabric which extends across the side face of the panel but, if necessary, the fabric can also release from the Velcro strips 49 if a sufficient tension is created in the fabric so as to cause such release. This inward movement of the rollers 55 can also be utilized as the control signal for energizing the induction heating elements 72. After the rollers 55 have been moved inwardly, then the drive for the table 38 is energized and/or engaged with the table to effect forward advancing movement of the panel into and through the region defined between the opposed sets of rollers 55. This initiation of movement of the panel causes the energized induction heating elements 72 to relatively slowly move longitudinally along the upper groove parts 22 to effect rapid heating thereof, and hence effect melting of the adhesive films 29 contained therein. Substantially simultaneous with this melting of the films, the rollers 55 effect progressive deflection of the fabric into the upper grooves 24 as the panel progressively moves into and through the gap between the opposed devices 39. The portion of the fabric which is thus folded around the roller blade and inserted into the groove 24 is thus pushed into and held in intimate contact with the melted adhesive both around the curved bottom of the groove 24 and also on the adjacent sidewalls of the groove, substantially as diagrammatically illustrated by FIG. 3, to provide direct and intimate contact of the melted adhesive with both the fabric and the sidewall of the groove over a substantial sideward extent. As the panel continues forward, the rollers 55 continue to press the fabric into the groove and, when the rail moves forwardly beyond the downstream end of the induction heating element 72, then the melted adhesive immediately begins to cool and solidify. This cooling is accelerated by the blowers 65 discharging cold air against the metal rail 14 which, due to its size, effectively functions as a heat sink to thus rapidly extract heat from the adhesive to effect rapid solidification thereof. During this solidification of the adhesive, and throughout the traversing of the panel past the cooling nozzles 65, the rollers 55 continue to urge the fabric into the channel and maintain the fabric in intimate contact with the adhesive until proper cooling and solidification has occurred so that the inwardly folded section of fabric as disposed in the groove is fixedly and securely anchored to the edge rail. Due to the resilience provided by springs 63, the rollers 55 can resiliency retract due to dimensional variations, but the springs 63 are of sufficient strength as to be able to overcome the fabric tension when the fabric stretches across the groove so as to fold the fabric inwardly into the groove and push the fabric firmly against the bottom of the groove while maintaining the melted adhesive layer therebetween.

After the panel with the fabric secured along one pair of opposed edges moves outwardly beyond the downstream end of the roller sets, then the roller sets are retracted back to their inactive positions. At that time the next panel as positioned at station 33 is advanced forwardly to the position indicated by dotted line 77 so as to permit the same operation to be initiated and performed on the next panel.

As to the panel which has already passed through the fabric securing station 34, it moves to the transfer station 35 which, in this variation of the invention, results in the support table 38 being engaged by a transversely extending drive so that table 38 is then moved in the direction of arrow B toward the other pair of fabric securing devices 40. When the panel reaches a position wherein the lead edge thereof is overlapped with the inserting rollers but is still upstream of the induction heater, then the panel is stopped and, the roller units moved inwardly so that the upstream roller inserts the fabric into the opposed rails 13 adjacent the leading corners of the panel. The panel is then advanced forwardly into and through the opposed securing devices 40 which insert the fabric, melt the adhesive, and thereafter cool and solidify the adhesive to secure the fabric within the grooves of the rails 13 in the same manner as described above.

When the panel is discharged from the second fabric securement station 36, the fabric has been adhesively secured within grooves along all four edges of the panel. If securement of a fabric to the other side of the panel is desired, then the panel is vertically rotated 180° so that the other side face faces upwardly, and then the panel is covered by a fabric and the edges thereof secured in a same manner described above. This is accomplished either by sending the panel back through the apparatus a second time, or more preferably by providing a second such apparatus downstream of the first apparatus.

It is preferable to initially position the lead or forward end of the panel in slight overlapping relationship with the roller units, and then move the roller units inwardly so that the lead or upstream rollers engage the fabric and fold it into the groove as the roller is moved into the groove in a direction which is substantially perpendicular relative to the elongated direction of the respective rail. This facilitates insertion of the fabric directly adjacent the leading corner of the panel and facilitates the initiation of the insertion of the fabric without skewing, puckering or otherwise distorting or positionally changing the fabric. Once the fabric has been inserted adjacent the lead end corner of the respective groove, then the progressive movement of the panel through the rollers enables the remainder of the fabric along the edge of the panel to be efficiently and properly rolled into the groove as the panel moves along the set of freely-rotatable rollers.

The adhesive 29 used for securing the fabric to the edge rails may constitute any conventional adhesive which will function so as to provide for proper securement of the fabric, and yet will also permit the fabric to be secured utilizing a technique similar to that as described above. It has been determined that a "hot melt" adhesive, such as a polyamide, is desirable for this purpose.

With the improved fabric securement of this invention, the fabric coverings can be efficiently secured to opposite sides of the panel in a time and labor saving manner and yet provide for desirable securing of the fabric covering so that the latter will have the desired tautness for both appearance and durability purposes. The fabric need not be secured by use of a separate securing element such as an elastic endless band, such as was conventional in the prior art. However, inasmuch as panels of this type are often recovered with new fabrics several years after put into use, either for replacing worn covers or providing a new color, the fixed securement of the fabric according to the present invention is still highly desirable and suitable for permitting subsequent replacement of the fabric at the job site. The solidified adhesive which secures the fabric directly to the metal channel in the present invention is such that, by application of manual pulling force to the edge of the fabric, the fabric can be forcibly removed from the grooves by rupturing the hot melt attachment, thereby permitting entire removal of the fabric covering. A new fabric covering can then be positioned on the panel and the edges of the fabric inserted into the channels and secured using a conventional technique, such as by utilization of an endless elastic band or a paper spline. The present invention is highly advantageous since it does permit job-site recovering and securement of new fabric covering using a conventional technique employing a separate fastener since an adhesive securing technique is generally not suitable for job-site recovering.

The solidified strip of adhesive 29 is preferably sprayed into the frame rails so as to permit creation of a thin solidified film or layer which extends over a significant cross sectional extent of the U-shaped inner wall defining the channel or groove 24. This thin film not only greatly facilitates the remelting of the adhesive by the induction heater so as to permit rapid and efficient remelting, but it also results in the melted adhesive being disposed more directly for intimate contact with the fabric over a significant dimension which extends transversely of the groove so that the adhesive contacts the fabric not only along the bottom of the groove but also on both sides of the groove, thereby creating a securement area with the fabric which extends not only throughout the entire longitudinal length of the groove, but which is also of significant width as measured transversely of the groove. This film or layer of adhesive which is sprayed into and solidified on the inner wall of the groove preferably has a thickness in the range of about 0.030 to about 0.045 inch. While use of this film or thin layer is preferred, it will be appreciated that in place thereof a solidified adhesive bead can be deposited in the bottom of the groove so as to extend longitudinally therealong, although such bead will necessarily be of greater thickness and would require greater induction heating intensity and/or time so as to effect proper melting thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for securing a flexible sheet of fabric to an enlarged side face of a panel having opposite and generally parallel side edges defined by generally parallel and elongate edge members each having an elongate and outwardly opening retaining channel extending longitudinally thereof, said apparatus comprising:

support means for supporting said panel thereon in an orientation wherein the side face of the panel is disposed substantially horizontally and faces upwardly;

means associated with said support means for stationarily supportingly holding said panel relative to said support means;

inserting means including a pair of inserting devices positioned adjacent opposite parallel edge members of the panel for effecting simultaneous insertion of opposite edge portions of the fabric into the retaining channels, of the parallel edge members each said inserting device including a blade-shaped inserting roller sized so as to project into the retaining channel;

heating means positioned in close proximity to each of said inserting devices for effecting heating of and melting of a solidified adhesive contained in the respective retaining channel;

means for effecting relative movement between said panel and said inserting device for effecting relative movement between said panel and said inserting roller in a direction generally parallel to the lengthwise extent of the edge member to effect rolling-movement of the inserting roller longitudinally along the retaining channel so as to insert the fabric into the respective retaining channel for engagement with the adhesive therein: and cooling means positioned adjacent each said inserting device, downstream of Said heating means, for effecting cooling and resolidification of the adhesive to effect attachment thereof to the fabric inserted into the retaining channel.

2. An apparatus according to claim 1, wherein said fabric-inserting roller is resiliently-urged transversely toward the retaining channel.

3. An apparatus according to claim 2, wherein said relative movement means also includes a drive means coupled to said inserting roller for effecting movement thereof between a first position wherein the roller is positioned adjacent but spaced outwardly from the retaining channel, and a second position wherein the roller projects into the retaining channel.

4. An apparatus according to claim 1, wherein said heating means comprises an electrically-energized induction element positioned upstream relative to said cooling means in adjacent relationship to the inserting roller.

5. An apparatus according to claim 1, wherein each said inserting device includes a plurality of said inserting rollers disposed generally in side-by-side relationship so as to define a generally elongate row which extends generally parallel with the respective retaining channel, said plurality of inserting rollers being independently rollingly supported for rotation about generally parallel axes.

6. An apparatus according to claim 5, including resilient mounting means provided on the inserting device and independently cooperating with each of the inserting rollers so that each said inserting roller is resiliently urged transversely toward the respective retaining channel.

7. An apparatus according to claim 5, wherein said means for stationarily supportingly holding said panel includes a pair of clamping devices mounted on said support means adjacent the opposite parallel side edges of the panel for releasable engagement with the respectively adjacent edge member to fixedly secure the panel to the support means, each said clamping device including a clamping member which is movably mounted on the support means and is movable transversely toward the respectively adjacent edge member for engagement therewith.

8. An apparatus according to claim 1, including a carrier positioned adjacent at least one side of said support means and mounting thereon one of the inserting devices and the heating and cooling means which are positioned adjacent one side of the panel, said carrier being movably supported relative to the support means for movement transversely toward or away from the respectively adjacent edge member to accommodate panels of different width.

9. An apparatus according to claim 1, wherein said cooling means includes a plurality of cooling nozzles associated with each said inserting device for discharging streams of cool air toward the adjacent edge member, at least some of some cooling nozzles being positioned generally between adjacent ones of said inserting rollers.

10. An apparatus for securing a flexible sheet of fabric to an enlarged side face of a generally rectangularly-shaped panel having first and second pairs of opposite and generally parallel side edges defined by generally parallel and elongate edge members each having an elongate and outwardly opening retaining channel extending longitudinally thereof, the side edges of said first pair extending generally perpendicularly relative to the side edges of said second pair, said apparatus comprising:

a stationary frame;

a support table movably supported on said frame for movement horizontally in a first direction relative to the frame, said support table defining thereon an upwardly facing structure for supporting said panel thereon in an orientation wherein the first pair of side edges of the panel extend generally parallel with said first direction and wherein the enlarged side face of the panel is disposed substantially horizontally and faces upwardly;

a drive device cooperating with the support table for effecting movement thereof relative to said frame along said first direction;

a pair of clamping devices mounted on the support table in generally opposed relationship to one another for fixedly but releasably clampingly engaging opposite sides of the panel to fixedly but releasably secure the panel to the support table, said clamping devices being positioned adjacent opposite parallel sides of the panel member and each including a movable clamping member which is engageable with the respectively adjacent edge member of the panel;

a pair of fabric clamps mounted on said support table adjacent said first pair of opposite and parallel side edges of said panel for releasable engagement with opposite edge portions of the fabric which is positioned over the upwardly-facing enlarged side face, said fabric clamps causing the opposite edge portions of the fabric to be deflected downwardly over the retaining channels associated with the parallel edge members of said first pair of parallel side edges;

a pair of fabric inserting devices mounted on said frame in sidewardly spaced relation for permitting the panel to be moved therebetween when the support table is moved in said first direction, each said inserting device being positioned for cooperation with a respectively adjacent one of the side edges of said first pair for inserting the edge portion of the fabric into the respective retaining channel, each said inserting device being elongated generally along the respective retaining channel and including a blade-shaped inserting member sized so as to project into the retaining channel, said inserting member engaging the edge portion of the fabric which extends between the respective edge member and the respective fabric clamp for causing the fabric to be inserted into the respective retaining channel in response to movement of said support table in said first direction;

a pair of electrically-energized induction heating devices mounted on said frame in sidewardly spaced relation for permitting the support table to be moved therepast, each said heating device being disposed adjacent a respective one of said inserting devices and also being positioned so as to be in close proximity to one side edge of the panel as the support table moves in said first direction, said heating device effecting heating of an adhesive contained in the respective retaining channel, said heating device being elongated generally parallel with the respectively adjacent retaining channel; and a pair of cooling devices mounted on said frame in sidewardly spaced relationship for permitting the panel to move therepast in response to movement of said support table in said first direction, each said cooling device being mounted adjacent but downstream of one of the heating devices.

11. An apparatus according to claim 10, wherein the inserting member includes a plurality of rotatable blade-shaped inserting rollers supported for rotation about generally parallel axes and disposed generally within an elongate row which extends generally along the respective retaining channel so that said plurality of inserting rollers project into the retaining channel.

12. An apparatus according to claim 11, including resilient mounting means provided on the inserting device and independently cooperating with said inserting rollers so that said inserting rollers are resiliently urged transversely toward the respective retaining channel.

13. An apparatus according to claim 11, wherein each said cooling device includes a plurality of nozzles for discharging streams of cool air toward the adjacent retaining channel, at least some of said nozzles being positioned generally between adjacent ones of said inserting rollers.

14. An apparatus according to claim 10, including a carrier movably mounted on said frame adjacent at least one side thereof for movement transversely relative to said first direction, said carrier mounting thereon the inserting, heating and cooling devices disposed adjacent one side of the support table for adjusting the position thereof to accommodate panels of different width.

15. An apparatus according to claim 10, wherein said frame includes a generally L-shaped structure including a first leg part which defines said first direction and a second leg part which defines a second horizontal direction which is substantially perpendicular to said first direction, said support table being mounted on said frame for movement along said first leg part in said first direction followed by movement of the support table in said second direction along said second leg part;

a second pair of fabric clamps mounted on said support table in sidewardly spaced relation for permitting the panel to be positioned therebetween, said second pair of fabric clamps being positioned adjacent said second pair of parallel side edges for releasable engagement with opposed edge portions of said fabric; and a second pair of inserting devices, heating devices and cooling devices mounted on said second leg part of said frame in sidewardly spaced relation for permitting said panel to move therebetween as the support table is moved along said second direction, said second pairs of inserting, heating and cooling devices cooperating with said second pair of parallel side edges of said panel.

* * * * *

UNITED STATES PATENT AND TRADEMARK OFFICE
CERTIFICATE OF CORRECTION

PATENT NO. : 5,407,522
DATED : April 18, 1995
INVENTOR(S) : Robert W. INSALACO, et al.

It is certified that error appears in the above-indentified patent and that said Letters Patent is hereby corrected as shown below:

```
Column 13, line 23; delete ",".
          line 23; after "members" insert ---,---.
          line 37; delete "-" (first occurrence).
          line 40; change ":" to ---;---.
          line 42; change "Said" to ---said---.
```

Signed and Sealed this

Nineteenth Day of September, 1995

Attest:

BRUCE LEHMAN

Attesting Officer

Commissioner of Patents and Trademarks